April 30, 1968     A. W. COCHARDT     3,380,920
PERMANENT MAGNET MATERIAL AND PROCESS
FOR MANUFACTURING SAME
Filed May 28, 1964

INVENTOR
Alexander W. Cochardt
BY
ATTORNEY

_United States Patent Office_

3,380,920
Patented Apr. 30, 1968

3,380,920
PERMANENT MAGNET MATERIAL AND PROCESS
FOR MANUFACTURING SAME
Alexander W. Cochardt, Export, Pa., assignor to Westinghouse Electric Corporation, East Pittsburgh, Pa., a corporation of Pennsylvania
Filed May 28, 1964, Ser. No. 370,904
Claims priority, application Germany, May 30, 1963,
C 30,079
15 Claims. (Cl. 252—62.63)

This invention relates to novel ferrite permanent magnets containing a small amount of iron in the bivalent condition and thereby characterized in having an improved coercive force and an unusually high maximum energy product, and to a method for preparing such magnets.

The invention is primarily concerned with the permanent magnet materials characterized by a magneto plumbite crystalline structure having the composition $MO \cdot 6Fe_2O_3$ in which M is at least one of the metals of the group consisting of lead barium and strontium. Magnets made from such materials have, in recent years, gained increasing prominence and wide acceptance and application in industry.

In making these ferrite magnets the starting materials are ferric oxide ($Fe_2O_3$), and one or more oxides, or compounds which yield oxides of lead, barium and strontium. The basic composition outlined above may be modified by the addition of small amounts of $Al_2O_3$, $CaO$, $MgO$, $SiO_2$ and other compounds for various purposes, and small amounts of impurities may also be present.

The starting materials are thoroughly mixed and presintered to a temperature of from about 900° C. to 1450° C. for a sufficient time to form a "clinker" consisting of material of the composition described above. One such suitable process for lead, barium and strontium ferrites requires a four hour presintering period at approximately 1000° C. The clinker thus obtained is crushed and pulverized to a fine particle size usually in a fluid medium and then is compacted into green magnet pieces having the desired configuration. These green magnet pieces are then sintered at temperatures of from about 900° C. to 1450° C. to produce a sintered permanent magnet body. The process just described produces an isotropic permanent magnet. To produce an anisotropic permanent magnet, the compaction of the green magnet is carried out in a magnetic field to orient the crystalline particles of the magnet, and this is quite commonly practiced.

In the manufacture of soft magnetic ferrites, which involves the sintering of mixtures of iron oxide with, for example, manganese and zinc oxides or nickel and zinc oxides, the desired result is a material having a low coercive force and a high permeability. This contrasts with the high coercive force and low permeability desired in the permanent magnet materials with which this invention is concerned. In the case of the soft magnetic ferrites it is known that the desired reduction in the coercive force and the increase in permeability may be obtained by sintering the ferrite clinker in a reducing atmosphere, for example, in carbon dioxide at approximately 1450° C. for from 12 to 15 hours and thereafter exposing the sintered product to an oxygen atmosphere for a longer period of time, for example, for up to 400 hours at 1250° C. The ferrite structure thus exposed to an oxygen atmosphere is completely reoxidized, i.e., any material reduced by the reducing atmosphere is oxidized and no reduced product remains in the treated ferrite.

The present invention provides a method for improving the magnetic characteristics of lead, barium and strontium ferrite magnets. This is accomplished by providing in the magnet from approximately 0.1 to 3.0%, by weight, of iron in the bivalent condition based upon the total ferrite weight. The iron in the bivalent condition is present in a secondary phase which is disposed along grain boundaries and dislocation centers of the primary ferrite phase. It has been found that the formation and retention of the secondary phase containing iron in the bivalent state at the crystal boundaries or at the dislocation centers of the crystal grains, leads to a significant increase in the coercive force and the maximum energy product.

It is the object of this invention to provide permanent magnet bodies consisting principally of hexagonal crystals with a magneto plumbite structure of a compound $MO \cdot 6Fe_2O_3$, in which M is at least one metal selected from the group consisting of lead, barium and strontium; the magnet bodies having a small, but critical amount of a second phase containing iron in the bivalent condition, and characterized by a high coercive force and a high maximum energy product.

It is a further object of the invention to provide a process for making ferrite material containing iron in the bivalent condition as described.

Other objects of the invention will, in part, be obvious and will, in part, appear hereinafter.

For a better understanding of the nature and objects of this invention, reference should be had to the following detailed description, and drawings, in which.

Figure 1:
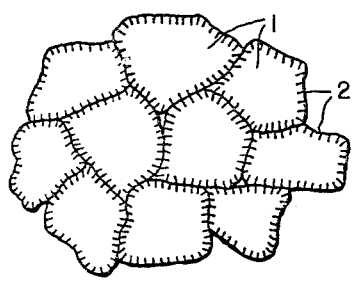
FIGURE 1 is a schematic showing of the crystalline structure of the magnetic material in accordance with this invention.

The novelty in the process of the present invention resides in a selective reduction of the presintered ferrite powder which occurs essentially only in the boundary layers of the crystalline grains, resulting in a secondary phase containing iron in the bivalent condition. It is necessary in the practice of this invention to control the amount of reduction which occurs, because if the entire crystalline structure is reduced the permanent magnet properties are destroyed. Further, it is of special importance that the process of the invention be carried out in such a manner that the reoxidation of the iron in the bivalent state to trivalent iron is prevented, or if it occurs at all, is limited to a small portion of the bivalent iron.

In one process in accordance with the invention the presintered and finely ground ferrite powder is selectively reduced by subjecting it to a reducing medium such as reducing gases at an elevated temperature and then it is compacted, sintered and cooled in a manner such as to retain the secondary phase containing the iron in the bivalent condition. Suitable gases for such reduction are carbon dioxide, carbon monoxide and hydrogen. Commercial dissociated ammonia or water gas or mixtures of such gases are also suitable.

Alternatively, the presintered and ground ferrite powder may first be compacted into magnet cores and the magnet cores thereafter reduced in a reducing gas atmosphere and subsequently sintered and cooled under such conditions that the secondary phase containing the iron in the bivalent state is essentially retained. In this case, the reduction occurs during the heating to the sintering temperature. This procedure is especially advantageous in manufacturing small sintered magnet pieces.

In another method of practicing the process of the invention the presintered ferrite powder is mixed with additive materials which readily oxidize at temperatures below the sintering temperature. Such additive materials are added to the ground ferrite powder, the mixture is compacted to the desired magnet cores and the magnet cores are sintered so that the desired reduction takes place as a result of the reducing effect of the additives. Here, as in the other processes described, reoxidation of the iron in the bivalent condition contained in the secondary phase, to trivalent iron, is not permitted to occur to any substantial degree. Additives particularly suitable are metallic powders and intermetallic compounds which readily oxidize at elevated temperatures thereby causing the selective reduction to take place. They combine with some of the oxygen contained in the primary phase thereby providing the desired bivalent iron in a secondary phase along grain boundaries and dislocation centers of the matrix crystals. Nitrides, borides and many inorganic and organic compounds may be used such as TiC, WC, $ZrB_2$ and TiN, which decompose at a higher temperature and then have a reducing effect.

The most preferred additive is carbon in its several forms because it is inexpensive and has a strong reducing effect. Thus, graphite has been used successfully. In practicing the process of this invention using carbon additions, approximately 0.05% to about 1.0%, by weight, and preferably 0.1% to 0.3%, by weight, of graphite powder is added to the presintered ferrite powders. This mixture is thoroughly ground to a fine particle size, compacted to the desired configuration, rapidly heated to the sintering temperature and then it is held at the sintering temperature in air for a short time; for example, from 1 to 15 minutes. To prevent reoxidation during cooling to room temperature, the cooling may take place under a protective atmosphere such as argon. However, if the cooling is carried out sufficiently rapidly between the sintering temperature and about 500° C., the cooling can be conducted in air with only an insignificant amount of the undesirable oxidation occurring. Of course, the compaction is conducted in a magnetic field to orient the ferrite crystals and thereby obtain a superior magnet.

While the applicant does not wish to be bound by any particular theory as to the manner in which the process achieves its highly desirable results, it is supposed that the secondary phase containing the iron in the bivalent condition consists of one or more of $2MO \cdot 2FeO \cdot 6Fe_2O_3$, $MO \cdot 2FeO \cdot 8Fe_2O_3$ and $3MO \cdot 8FeO \cdot 12Fe_2O_3$, where M stands for Pb, Ba or Sr. Rapidly heating the material to the sintering temperature avoids any substantial volume diffusion of the oxygen atoms and thereby tends to maintain the secondary phase. It appears that the fine distribution of the secondary phase film at the grain boundaries makes the nucleation and motion of the domain walls more difficult. This in turn yields the relatively high coercive force and the remarkably low recoil permeability. The combination of relatively high remanence and coercive force with low recoil permeability gives a material having a high energy product. It has been noted that the grain size of the permanent magnet material is almost homogeneous. This characteristic is particularly desirable with respect to a favorable ($B^Hc/I^Hc$) ratio.

While the prior art primarily describes relatively pure lead, barium and strontium ferrites, a preferred magnetic material is the impure strontium ferrite which is fully described in U.S. Patent No. 3,113,927, issued Dec. 10, 1963. A short discussion of this impure strontium ferrite is appropriate at this point since the invention is readily applicable to this material. It has been found to be quite advantageous to use raw materials which have not been purified in making strontium ferrites. Thus, a relatively impure iron oxide may be employed together with a complex alkaline-earth carbonate. The term complex alkaline-earth carbonate is intended to include materials which in addition to the principal alkaline-earth component have other carbonates and other substances in minor quantities. Particularly advantageous has been the use of the mineral celestite as an initial raw material. The mineral celestite consists primarily of strontium sulphate. However, it also contains barium sulphate, silicon oxide, aluminum oxide and other constituents. The total sulphates and other constituents in such mineral deposits vary by a few percent depending upon the origin. One celestite which has been used had the following approximate composition expressed in weight percent:

| | Percent |
|---|---|
| $SrSO_4$ | 94.18 |
| $CaSO_4$ | 1.82 |
| $BaSO_4$ | 2.82 |
| $CaCO_3$ | 0.43 |
| $SiO_2$ | 0.50 |
| $Al_2O_3$ | 0.25 |

Employing this celestite, a sulphate-containing complex strontium carbonate is prepared by reducing the sulphate with carbon or by means of a reducing atmosphere to a sulphide. The sulphide is thereafter dissolved in water and then the carbonate-sulphate mixture is precipitated by means of a water soluble carbonate or by introducing carbon dioxide gas. In this way, a complex strontium carbonate is obtained which contains substantial amounts of the sulphate and whose strontium carbonate content lies in the region of 89–93%, by weight. Approximately, 5% of the complex strontium carbonate-sulphate consists of $CaCO_3$, $SrSO_4$, $BaSO_4$, $SiO_2$ and $Al_2O_3$. This complex strontium carbonate-sulphate is merely mixed with the iron oxide in the initial stages of the process.

The strontium ferrite permanent magnet material produced using the complex strontium carbonate-sulphate has a composition in the sintered condition according to chemical analyses essentially of, by weight, from 7% to 18% of SrO, from 0.1% to 2% of $SrSO_4$, up to 1% BaO, up to 1% of CaO, and the balance $Fe_2O_3$. It is also preferred to have small amounts of other constituents including up to 1% of a compound selected from the group consisting of $CaSO_4$, $BaSO_4$ and $Na_2O$, and up to 2% of at least one compound selected from the group consisting of $SiO_2$ and $Al_2O_3$. Up to 13%, by weight, of PbO may also be included in some cases.

It will be understood that the components stated above are those which are obtained upon chemical analysis of the ferrite; but the ferrite product as sintered, is a reacted, generally homogeneous material in which the indicated components are not present as discrete phases of inclusions.

It is common in the ceramic industry to use flux agents to aid the desired reactions. Thus, flux agents such as lithium fluoride, lithium carbonate, calcium fluoride, sodium borate, calcium borate, boric acid, feldspars, lead silicate and mixtures of them may be added up to 2%.

There follows an example of the practice of the process of this invention:

EXAMPLE

Raw materials in the proportions given below were employed:

| | Percent by wt. |
|---|---|
| Red iron oxide $Fe_2O_3$ | 84.0 |
| Complex strontium carbonate-sulphate | 14.5 |
| Natural calcium fluoride $CaF_2$ | 1.5 |

These raw materials are thoroughly mixed for four hours in a ball mill in a 2% aqueous solution of sodium naphthalenesulphate. The complex strontium carbonate, as described previously, contains in addition to strontium carbonate, other materials in small amounts to a total of about 5% consisting of $CaCO_3$, $SrSO_4$, $BaSO_4$, $SiO_2$ and $Al_2O_3$.

The mixed slurry is dried in a rotary kiln at approximately 1100° C. which removes the water by evaporation and provides a dry mass of material. This dried mass is then presintered in a second kiln for about 10 minutes at 1240° C. The saturation moment per unit mass of this presintered clinker is only about 63 gauss cm.³/g., because the presintering does not produce complete formation of the ferrite. In addition, a surplus of alkaline-earth metal oxide still exists in the clinker. At this point in the process no bivalent iron can be detected by chemical analysis.

The presintered clinker is then ground for 48 hours in a ball mill in a 3% solution of sodium naphthalenesulphate. At the beginning of this ball milling step, 0.1%, by weight, of graphite powder based on the total dry weight of the clinker, is added to the presintered clinker. The ball milled slurry is compacted in a filter press in a homogenous magnetic field increasing from 4200 to 5800 oersteds under a gradually increasing pressure which reaches a maximum of 4000 p.s.i. During the compaction the water is removed uniformly and slowly by filtering.

Figure 2:
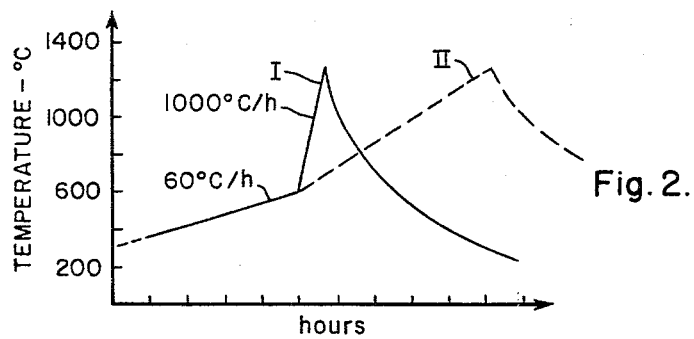
FIGURE 2 is a graph of "sintering runs" in which the temperature is plotted against time.

The compacted pieces are dried and then heated in air at a rate of from 50–100° C./hr., for example, at 60° C./hr. up to approximately 600° C. When the compacted pieces reach a temperature of about 600° C. the rate of heating is accelerated to approximately 1000° C./hr. (curve I in FIG. 2), to the sintering temperature of 1280° C. The high rate of heating may be obtained, for example, by placing the compacted pieces after reaching 600° C. into a second kiln which has been heated to a temperature of 1350° C. When the compacted pieces have reached a temperature of 1280° C., as determined by a thermocouple, the sintered compacts may be removed from the kiln so that the sintering time at 1280° C. amounts to only about one minute. The dimensions of this sintered compact are, for example, 2 inches diameter and ½ inch length. The sintered compacts are cooled in air and the cooling rate approximately corresponds to the rapid heating rate, i.e., 1000° C./hr. After cooling the compacts are magnetized in a field of 10,000 oersteds and are found to have the following properties:

Remanence _____ $B_r = 4470$ gauss.
Coercive force _____ $I^H c = 2390$ oersteds.
Energy product _____ $(BH)_{max.} = 4.0$ m.g.o.
Recoil permeability _____ $\mu rec. = 1.00$ gauss/oersteds.
Ratio _____ $(B^H c / I^H c) = 0.99$.

Figure 3:
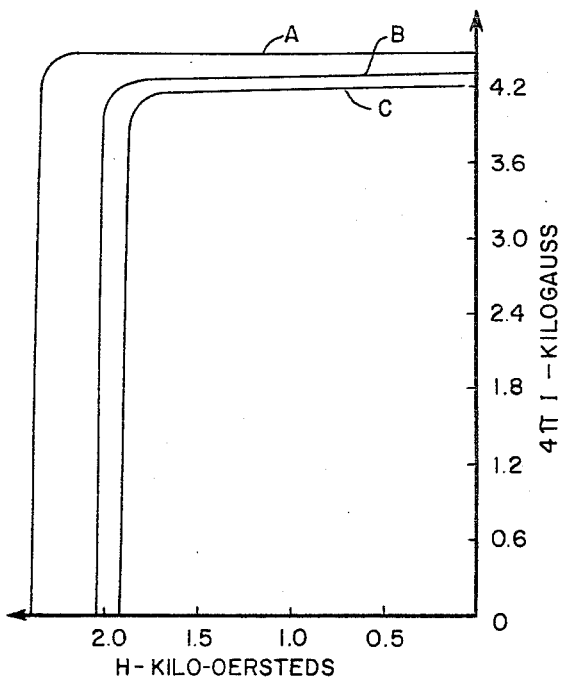
FIGURE 3 is the second quadrant of the magnetization curve both of the material of this invention and for materials of the prior art.

Especially noteworthy is the recoil permeability of only 1.00 gauss/oersteds. In FIG. 3, there appears a curve A, which represents the magnetization curve of the material of this example. The slope of the magnetization curve starting from the $B_r$—point is zero; hence the permeability is 1.00 gauss/oersted. Chemical analysis of the permanent magnets manufactured as described above revealed that about 0.2 percent, by weight, of bivalent iron was present in the magnet.

To show the effect of the reducing agent in the process described above, the process was carried out in all respects identical to that just described, except that, the addition of graphite powder was omitted. The permanent magnets produced in this manner have the following properties:

Remanence _____ $B_r = 4320$ gauss.
Coercive force _____ $I^H c = 2040$ oersteds.
Energy product _____ $(BH)_{max.} = 4.3$ m.g.o.
Recoil permeability _____ $\mu rec. = 1.02$ gauss/oersteds.
Ratio _____ $(B^H c / I^H c) = 0.98$.

The magnetization curve for these magnets is shown by curve B in FIG. 3. The substantial decrease in properties is readily seen from this magnetization curve.

The process as described in the example was also carried out in a manner so as to show the importance of the rapid heating rate to the sintering temperature. In this case the process was conducted in all respects similarly to the example described above, except that, the heating of the compacts from 600° C. to the sintering temperature of 1260° C. was carried out at a rate of only approximately 130° C./hr., (curve II in FIG. 2) and the sintering at 1260° C. was prolonged for a period of about 10 minutes. The permanent magnets produced by this process have the following properties:

Remanence _____ $B_r = 4200$ gauss.
Coercive force _____ $I^H c = 1910$ oersteds.
Energy product _____ $(BH)_{max.} = 4.1$ m.g.o.
Recoil permeability _____ $\mu rec. = 1.02$ gauss/oersteds.
Ratio _____ $(B^H c / I^H c) = 0.98$.

The magnetization curve C corresponding to these permanent magnets is also shown in FIG. 3. Due to the high partial pressure of oxygen in the kiln and to the relatively low heating rate, oxidation occurs to an excessive degree and the graphite powder in the compacted pieces is burned before shrinking and sintering begins. Therefore, the reduction does not occur and the secondary phase containing the desired bivalent iron is not formed. Thus, it is clear that merely employing graphite is not sufficient to produce the superior magnets of this invention if sufficient precautions are not taken to prevent the burning-out of the graphite. If desired, the sintering and cooling may be carried out in a protective atmosphere such as argon or helium to avoid the oxidation problem.

In a still further series of experiments the process of the example was varied by changing the amount of the graphite addition. It was established that an addition of 0.1 to 0.3%, by weight, of graphite yielded the optimum properties in the permanent magnets in regard to the energy product. It should be understood that in some cases a small amount of graphite may be lost during the filtering of the powders. The actual amount of the graphite present may therefore be slightly less than indicated by the amount of the addition.

In another series of experiments the rate of heating and the amount of the graphite additions were both varied. It was found in this series of experiments that a slower heating rate in air required a larger graphite content in order to obtain the optimum values. At the slow heating rates and large graphite additions, there exists the disadvantage that a sizable volume diffusion of oxygen atoms may increase the amount of the bivalent iron-containing phase to an excessively large degree, nullifying at least in part the beneficial effect expected. Generally then, the small additions of graphite and rapid rates of heating will produce the optimum results.

In yet another series of experiments the green compacts charged with graphite were subjected to various heat treatments before the sintering process. It was established that a 16 hour soaking at 700° C. in air before sintering results in magnets having relatively low remanence, $B_r$. During the prolonged heat treatment at 700° C. most of the graphite is burned out and consequently almost no bivalent iron remains. This treatment results in magnets having generally poor properties. It has also been established that a significant improvement of permanent magnet properties may be obtained by means of the addition of carbon-containing compounds or other materials containing carbon. Thus, as substitutes for graphite, any of the following additions produces the desired bivalent iron in the ferrite material:

| | Percent by wt. |
|---|---|
| Titanium carbide | 0.2–1.5 |
| Tunsten carbide | 0.5–5 |
| Cast iron powder | 0.5–3 |

The cast iron powder of the above table had the following composition:

| | Percent by wt. |
|---|---|
| C | 4.25 |
| Si | 1.14 |
| Mn | 0.22 |
| S | 0.019 |
| P | 0.033 |
| Fe | Balance |

While the process of the example was directed to the manufacture of strontium ferrite materials, the process may be used with equal success for the manufacture of barium ferrite or lead ferrite permanent magnets. The raw materials for making barium ferrite, for example, are:

| | Percent by wt. |
|---|---|
| Red iron oxide $Fe_2O_3$ | 81.4 |
| Barium carbonate $BaCO_3$ | 18.6 | with the addition of graphite or similar reducing additives as has been described.

There has thus been described a ferrite material having a two phase structure in which the secondary phase includes iron in the bivalent condition. Such as ferrite material is substantially better magnetically than materials of this type which do not contain the bivalent iron.

It is to be understood that the materials and method and process described are to be interpreted as exemplary and not limiting.

I claim as my invention:

1. In a process for making sintered ferrite permanent magnets which includes the steps of compacting a finely divided presintered mass of crystalline material generally conforming to the composition $M \cdot Fe_{12}O_{19}$ in which M is at least one metal selected from the group consisting of lead, barium and strontium and the iron is in the trivalent condition, and after compaction sintering the compact at an elevated temperature, the improvement comprising the reducing during sintering a portion of the trivalent iron present in the presintered material to the bivalent condition forming a discrete second phase and maintaining from about 0.1% to 3%, by weight, of iron in the bivalent condition in the body of the sintered magnet.

2. In a process for making sintered ferrite permanent magnets which includes the steps of compacting a finely divided presintered mass of crystalline material generally conforming to the composition $M \cdot Fe_{12}O_{19}$, in which M is at least one metal selected from the group consisting of lead, barium, strontium and the iron is in the trivalent condition, and after compaction, sintering the compact at an elevated temperature, the improvement comprising contacting the finely divided presintered mass of crystalline material with a reducing gas during sintering whereby from 0.1% to 3%, by weight, of bivalent iron is produced in a discrete second phase and substantially preventing reoxidation of said bivalent iron in the subsequent treatment.

3. The process of claim 2 wherein the reduction is carried out prior to the compaction of the finely divided presintered mass of crystalline material.

4. The process of claim 2 in which the reduction is carried out subsequent to compaction of the finely divided presintered mass of crystalline material.

5. In a process for making sintered ferrite permanent magnets which includes the steps of presintering a mixutre including $Fe_2O_3$ and at least one oxide or compound yielding an oxide of lead, barium and strontium at a temperature of from about 900° C. to 1450° C. to form a crystalline material generally conforming to the composition $M \cdot Fe_{12}O_{19}$ in which M is at least one metal selected from the group consisting of lead, barium and strontium and the iron is in the trivalent condition, finely dividing the presintered material, pressing the finely divided presintered material to form a compact having a predetermined configuration, and sintering the compact at an elevated temperature of from about 900° C. to 1450° C., the improvement comprising adding a reducing agent in powder form intimately throughout the finely divided presintered mass of crystalline material and heating the said crystalline material at a high heating rate of from 300 to 2000° C. per hour from 600° C. to the sintering temperature whereby from 0.1% to 3% of bivalent iron is produced and maintained in the sintered body.

6. The process of claim 5 in which the reducing agent consists essentially of from 0.05% to about 1%, by weight, of graphite powder.

7. The process of claim 5 in which the reducing agent consists essentially of from 0.1% to 0.3%, by weight, of graphite powder.

8. The process of claim 5 in which the reducing agent consists essentially of from 0.2% to 1.5%, by weight, of powdered titanium carbide.

9. The process of claim 5 in which the reducing agent consists essentially of from .5% to 5%, by weight, of powdered tungsten carbide.

10. The process of claim 5 in which the reducing agent consists essentially of from about .5% to 3%, by weight, of powdered cast iron.

11. In a granular permanent magnet ferrite material generally conforming to the composition $M \cdot Fe_{12}O_{19}$, in which M is at least one metal selected from the group consisting of lead, barium and strontium and the iron is in the trivalent condition, the improvement consisting of the presence of from 0.1% to 0.5% by weight, of iron in the bivalent condition in the material in a secondary phase film at the boundary of each ferrite grain.

12. A sintered granular permanent magnet material consisting essentially of, by weight, from 7% to 18% of SrO, from 0.1% to 2% of $SrSO_4$, up to 1% of BaO, up to 1% of CaO, from 0.1% to 3.0%, by weight, of bivalent iron in the secondary phrase film at the boundary of each ferrite grain, and the balance $Fe_2O_3$.

13. The magnet material of claim 12 containing PbO in amounts of up to 13%, by weight.

14. A sintered granular permanent magnet material consisting essentially of, by weight, from 7% to 18% of SrO, from 0.1% to 2% of $SrSO_4$, up to 1% of BaO, up to 1% of CaO, up to 1% of a compound selected from the group consisting of $CaSO_4$, $BaSO_4$ and $Na_2O$, up to 2% of at least one of the compounds selected from the group consisting of $SiO_2$ and $Al_2O_3$, from 0.1% to 3.0%, by weight, of bivalent iron in a secondary phase film at the boundary of each ferrite grain, and the balance $Fe_2O_3$.

15. The magnet composition of claim 14 containing PbO in amounts of up to 13%, by weight.

References Cited
UNITED STATES PATENTS

| 3,057,802 | 10/1962 | Pierrot et al. | 252—62.5 |
| 2,955,085 | 10/1960 | Jonker et al. | 252—62.5 |
| 2,980,617 | 4/1961 | Ireland | 252—62.5 |
| 3,113,927 | 12/1963 | Cochardt | 252—62.5 |

TOBIAS E. LEVOW, *Primary Examiner.*

ROBERT D. EDMONDS, *Assistant Examiner.*